J. C. TUDOR.
ROD PACKING.
APPLICATION FILED AUG. 19, 1912.
1,045,460.
Patented Nov. 26, 1912.
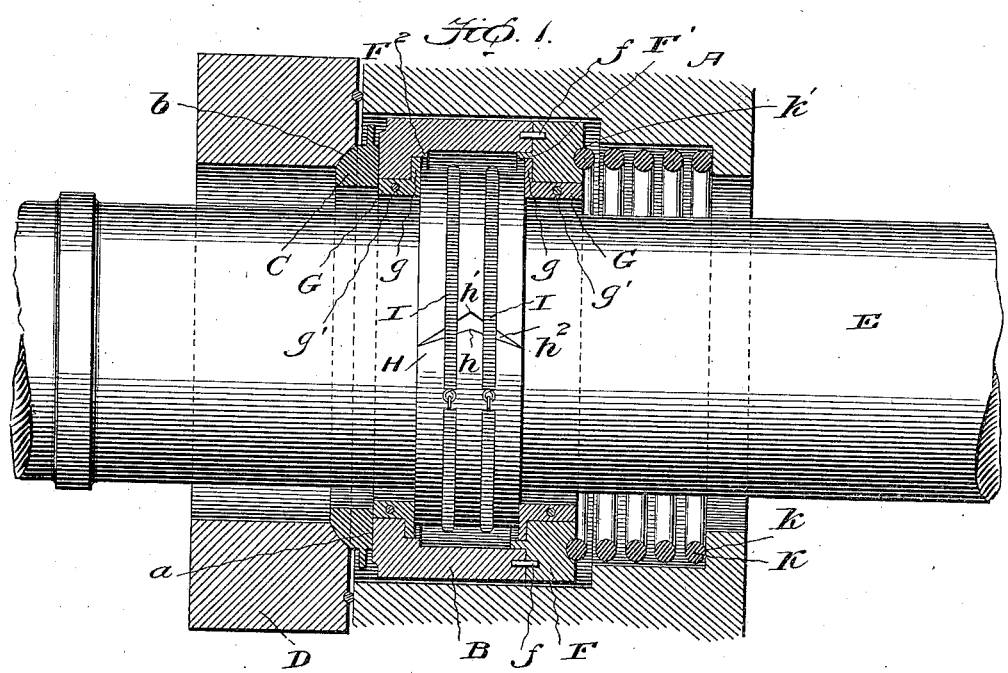
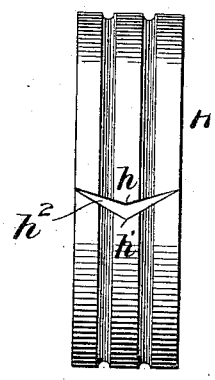
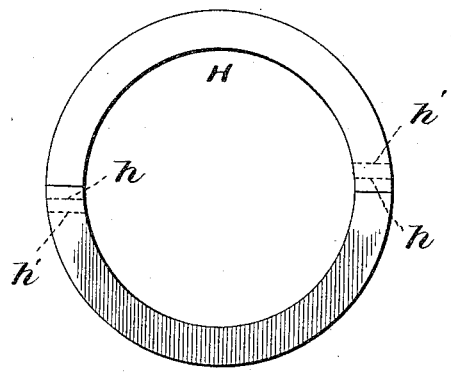
WITNESSES
G. Manning
INVENTOR
John C. Tudor.
By J. Walter Fowler, Attorney

UNITED STATES PATENT OFFICE.

JOHN C. TUDOR, OF BALTIMORE, MARYLAND.

ROD-PACKING.

1,045,460.	Specification of Letters Patent.	Patented Nov. 26, 1912.

Application filed August 19, 1912. Serial No. 715,847.

*To all whom it may concern:*

Be it known that I, JOHN C. TUDOR, a citizen of the United States, residing at Baltimore, State of Maryland, have invented certain new and useful Improvements in Rod-Packings, of which the following is a specification.

This invention relates to certain new and useful improvements in metallic packing for piston-rods and the like, and it consists of the parts and the constructions, arrangements and combinations of parts which I will hereinafter describe and claim.

A leading object of the present invention is to improve the metallic packing now used for locomotive engines and like purposes by simplifying the construction and reducing the number of parts necessary to form a complete packing, and to so arrange these parts that the packing may be removed and replaced with a loss of a minimum of time and at a comparatively small expense.

A further object of the invention is to so construct the packing that it will automatically adjust itself to the piston-rod and where the sections of the packing ring will automatically adjust themselves in response to wear whereby an absolutely steam-tight joint is maintained during the life of the packing.

In the accompanying drawings forming part of this specification and in which similar reference characters indicate like parts in the several views;—Figure 1 is a part section and part elevation of a rod-packing embodying the salient features of my invention. Figs. 2 and 3 are elevations of the packing ring removed.

In the aforesaid drawings, A, represents so much of the cylinder-head of a locomotive engine as may be necessary to illustrate the connection of the same with my improved metallic packing, but it will be understood that the packing hereinafter described may be used in other and different relations and with different types of mechanism and in different arts employing a reciprocating rod, without departing from the spirit of the invention.

Fitted within the cylinder head, A, is a round packing box, B, which in practice is about one-sixteenth of an inch smaller than the bore which it occupies in the cylinder head, and which packing box may be readily applied or removed through one end of the cylinder head, when desired and with but little delay and inconvenience.

The face, $a$, of the packing box is machined to form a steam-tight joint with the corresponding face of a ring, C, which itself has a face formed on a slight curvature as shown at $b$, to operatively seat against a corresponding surface formed upon the usual packing case, D, and which case may be bolted or otherwise fixed on the outside of one end of the cylinder head, as is common in the metallic packings now used for locomotive engines and wherein a packing case of the character described is usually employed. As this feature forms no essential part of my invention, the particular means for holding it to the cylinder head are not shown, but I might here state that the aforesaid engaging surfaces between the packing case and packing ring constitute a ball-and-socket connection, the ring serving as the ball and the packing case serving as the socket, and which connection allows for limited deflection of the piston-rod, E, which rod may represent any reciprocating rod, the movement of which may at times be slightly irregular or subject to more or less deflection from its true rectilinear path.

The leading features of my invention and which I will presently describe, may be used in connection with other arrangements than the specific packing case and ring mentioned, and hence I wish it understood that the following features are in no manner limited to the precise ball-and-socket joint hereinbefore described, but that they are subject to more general application and, therefore, may be used wherever it is desired to preserve a fluid tight joint between a packing and a reciprocating rod.

Abutting the inner end of the packing box, B, is a packing box ring, F, the two parts being fitted together by suitable dowel pins, $f$, and the packing box ring being supplied with an inwardly extending flange, F', which overlaps a portion of the inner end of the packing box, said flange and a corresponding offset, $F^2$, at the opposite end of the interior of the packing box ring forming annular seats or abutments for the laterally extending flanges, $g$, of suitable annular filler-rings, G, and which rings are preferably made in sections fitted together by means of dowel pins, $g'$.

By fitting the packing box and the packing box ring together, by means of dowels or like connections, and giving the same dimensions to the box and ring, I am enabled to hold the box and ring together and thereby make a solid packing case, which will be found steam-tight under the most trying conditions.

The filler-rings, G, may be formed of brass or some other appropriate material and in practice they will each be formed of similar segments fitted together by the dowel pins before mentioned. The filler-rings are preferably made of two semi-circular pieces and because of their lateral flanges, $g$, and the employment of the dowel pin connections they may be readily applied to or removed from the cylinder-head as occasion requires, while the flanges of these filler-rings coöperate with the corresponding faces of the metallic packing ring, which I will presently describe, to form face-joints for the packing ring to fit against.

Closely fitting between the adjacent surfaces of the opposed filler-rings is the metallic packing ring, H, and which packing ring is confined within the chamber of the packing box, said packing ring being preferably formed of two similar segments each having one end provided with a double-beveled or substantially V-shaped point, $h$, and each segment having the opposite end provided with a substantially similar double-beveled or inverted V-shaped recess, $h'$, except that the bevel or angle given the walls of the recess of one segment shall be sharper or more acute than the bevel or angle which is given the sides of the V-shaped projection at the opposite end of the same segment, whereby when the two similar segments are fitted together, the projection on one segment will be opposed to the recess in the other segment and there will be a well defined and substantially open space, $h^2$, between the meeting ends of the sections and which space is widest at the center of the packing ring and gradually decreases in size to the outer side faces of the packing, at which points the segments are in such close contact as to form substantially a steam-tight joint.

The sections of the packing are annularly grooved to receive the annular springs, I, whereby the sections are held yieldingly together and the joints at the outer ends of the clearance space, $h^2$, between the corresponding ends of the adjacent sections are maintained operatively tight. The packing ring as thus described, after being bored to fit the piston-rod, E, or corresponding member, remains in its proper position and automatically responds to slight deviation or deflections of the rod.

When the packing ring described is used in connection with a straight piston rod, the ring may be readily applied without removing the springs which circumscribe the ring; when used on a rod having a collar, the springs are removed to enable the sections of the ring to be opened or separated and properly applied to the rod and to each other, after which said sections are held in proper position by the employment of the springs before mentioned.

It will thus be manifest that in a ring of the character described, there is provided a clear open space, $h^2$, between the adjacent ends of the sections while the outside faces of the ring which operate against the inner faces of the filler-rings, are closed to insure a perfectly steam-tight fit in the packing box and on the piston rod. It will further be noted that as the packing ring wears on the rod, its sections are permitted to close by degrees in response to the wear, the space, $h^2$, provided between the adjacent ends of the ring sections gradually contracting in response to the wear on the inner periphery of the ring, and at the same time preserving the close contact of the outside faces which operate in contact with the filler-rings, thereby maintaining the steam-tight fit in the box, even after the packing ring has been worn to a substantial degree, and until this ring has become so worn as to be unfit for further practical use. It will also be observed that as the ring is confined in the box between the filler-rings, it adjusts itself to the position of the rod, and that it is not permitted to move backward or forward, but is confined in its one position in the packing box. This position of the ring is insured by means of a stiff coiled spring, K, which is located within the cylinder head and has one of its terminal coils bearing against a wall or shoulder, $k$, in the head, while the terminal coil at the opposite end seats within a groove, $k'$, formed in the face of the packing box ring, F, said groove being formed in the central portion of this packing box ring so as to preserve the maximum thickness of the ring as nearly as possible, and said spring bearing against the packing ring with sufficient pressure to insure the close engagement of the filler-rings with the corresponding sides or faces of the packing ring, and keeping the faces of the packing box and the ring, F, in close engagement and maintaining the packing case ring, C, in tight engagement with the packing case, D, whether the ring and case have ball-and-socket engaging surfaces or whether there is a plain-face joint between these parts.

By reason of the foregoing construction I have produced a simple and economical metallic packing for locomotive engines or for similar purposes and one which is complete and requires only four essential pieces and which pieces may be fitted to the cylinder head of engines now in use and may be used in connection with the packing case and packing case ring of such engines without modification of either.

By using the type of packing hereinbefore described, I overcome the great objection to many of the metallic packings now employed for locomotive engines, because when the cross-heads and guides are applied on the engine, it is almost impossible to line them perfectly true, and after the piston rod is applied to the cross head there is always a difference in the distance from the cylinder head bore to the outside of the rod, and this is shown more clearly when the packing case is applied, and for the reason stated, provision is made for the packing to have slight oscillation to thereby set itself to any position according to the way the rod is lined up. In my arrangement, the inner diameter of the packing box is greater than the external diameter of the packing ring, and the inner diameter of the filler-rings is likewise greater than the diameter of the piston rod, consequently sufficient space is provided in the box and filler-rings for the packing to adjust itself to the proper condition of the rod.

Having thus described my invention what I claim as new and desire to secure by Letters Patent is:—

1. A rod packing ring comprising a plurality of similar segments adapted to be fitted together to form a ring, each of said segments being fashioned at one end with a tongue portion having oppositely inclined surfaces, and having the opposite end recessed with the walls of the recess oppositely inclined, and the tongue portion of one segment opposing the recessed end portion of the adjacent segment to form between the segments a space which is widest at the center and gradually diminishes to the side faces of the ring.

2. A packing ring comprising segments fitted together, said sections having opposed double-beveled male and female meeting ends, said sections fitting closely together at the outer faces to form a steam-tight joint, and the opposed ends of the segments being beveled at different angles to maintain a space which diverges from the said outer faces of the segments toward the central plane of the ring, and an elastic member circumscribing the segments and holding them together in ring form.

3. The combination with a rod and a packing box, of a packing ring through which the rod passes, said ring being formed of similar segments each having one end formed with a projecting portion having walls which slope outwardly in opposite directions, and having the other end provided with a recess with walls which slope inwardly from the outer sides of the segment, the projecting end of one segment opposing the recessed end of an adjacent segment and the walls of the projection and recesses being at different angles to form between said ends a space which is widest at the center and diminishes to and becomes closed at the outer faces of the segments to form a steam-tight joint.

4. The combination with a rod and a packing box, of a packing ring through which the rod passes, said ring being formed of similar segments each having one end formed with a projecting portion having walls which slope outwardly in opposite directions, and having the other end provided with a recess with walls which slope inwardly from the outer sides of the segment, the projecting end of one segment opposing the recessed end of an adjacent segment and the walls of the projection and recesses being at different angles to form between said ends a space which is widest at the center and diminishes to and becomes closed at the outer faces of the segments to form a steam-tight joint, and springs circumscribing the segments and holding them together in ring form and automatically maintaining said joint as the ring wears.

5. A packing ring formed of segments fitted together in ring-form, said ring having the opposed ends of adjacent segments fashioned to form substantially a V-shaped opening between them, the walls of said opening contacting at the outer faces of the segments to form a steam-tight joint, and said space allowing the segments to approach each other in response to the wear of the ring, without altering the close joint at the faces of the ring.

6. The combination with a packing case, a packing case ring fitted thereagainst, a piston rod, and a packing ring on said rod, of a packing box, a separable packing box ring conforming and fitted to the packing box and forming therewith a case which incloses the packing ring, the internal diameter of the packing box being greater than the external diameter of the packing ring, and a spring bearing against the packing box ring for holding it in engagement with the packing box, and holding said packing box in close engagement with the packing case ring, and means circumferentially embracing the ring and holding the segments together in ring form.

7. The combination with a packing case, a packing case ring adjustably fitted thereto, a piston rod, and a packing ring on said rod, of a packing box bearing against and having a face joint with the packing case ring, a packing box ring separable from and bearing against the end of the packing box, said packing box and packing box ring forming a case which incloses the packing ring, filler-rings carried on the inner periphery of the packing box and packing box ring, and opposing each other and having inner faces overlapping the inner side faces of the packing box and packing box ring and engaging and forming a steam-tight joint with the corresponding faces of the packing ring, and a spring bearing against the packing box ring and holding said ring, packing box, packing ring and packing case in operative engagement.

8. The combination with a packing case, a packing case ring adjustably fitted thereto, a piston rod, and a packing ring on said rod, of a packing box bearing against and having a face joint with the packing case ring, a packing box ring separable from and bearing against the end of the packing box, said packing box and packing box ring forming a casing which incloses the packing ring, filler-rings carried on the inner periphery of the packing box and packing box ring and opposing each other and having inner faces overlapping the inner side faces of the packing box and packing box ring and engaging and forming a steam-tight joint with the corresponding faces of the packing ring, and a spring bearing against the packing box ring and holding said ring, packing box, packing ring and packing case in operative engagement, said filler-rings being formed of segments, and dowel-pins between the meeting faces of the segments for connecting the segments in annular form.

9. The combination with a packing case, a packing case ring adjustably fitted thereto, a piston rod, and a packing ring on said rod, of a packing box bearing against and having a face joint with the packing case ring, a packing box ring separable from and bearing against the end of the packing box, said packing box and packing box ring forming a case which incloses the packing ring, filler-rings carried on the inner periphery of the packing box and packing box ring and opposing each other and having inner faces overlapping the inner side faces of the packing box and packing box ring and engaging and forming a steam-tight joint with the corresponding faces of the packing ring, and a spring bearing against the packing box ring and holding said ring, packing box, packing ring and packing case in operative engagement, the inner diameter of the packing box being greater than the external diameter of the packing ring and the inner diameter of the filler-rings being greater than the diameter of the rod, to compensate for deflections in the movement of the rod.

In testimony whereof I affix my signature in presence of two witnesses.

JOHN C. TUDOR.

Witnesses:
JOHN T. MERCER,
ARTHUR G. MERCER.

---

Copies of this patent may be obtained for five cents each, by addressing the "Commissioner of Patents, Washington, D. C."